United States Patent [19]

Haley et al.

[11] 4,205,308
[45] May 27, 1980

[54] PROGRAMMABLE ALARM SYSTEM FOR MARINE LOADING ARMS

[75] Inventors: Frank P. Haley, Upland; Louis S. McTamaney, San Jose, both of Calif.

[73] Assignee: FMC Corporation, San Jose, Calif.

[21] Appl. No.: 853,800

[22] Filed: Nov. 21, 1977

[51] Int. Cl.² .................. G08B 21/00; B65B 1/04; G01C 1/00; G01B 3/56

[52] U.S. Cl. .................. 340/686; 33/1 M; 137/556; 141/387; 364/559

[58] Field of Search ............... 340/679, 685, 686, 689; 364/110, 559; 137/554, 556, 615; 212/39 A, 39 MS; 222/41, 42; 141/94, 387; 285/93; 33/1 M

[56] References Cited

U.S. PATENT DOCUMENTS

| | | | |
|---|---|---|---|
| 1,931,107 | 10/1933 | Dowell et al. | 114/230 |
| 2,588,842 | 3/1952 | Hutt | 248/82 |
| 2,855,886 | 10/1958 | Svoboda | 116/124 |
| 2,898,954 | 8/1959 | Freeman | 141/86 |
| 2,927,607 | 3/1960 | Bily | 137/615 |
| 3,050,092 | 8/1962 | Palcanis et al. | 141/387 |
| 3,073,280 | 1/1963 | Thiel | 116/124 |
| 3,566,386 | 2/1971 | Hamilton | 340/267 |
| 3,638,211 | 1/1972 | Sanchez | 340/685 |
| 3,819,922 | 6/1974 | Horn et al. | 235/193 |
| 3,833,130 | 9/1974 | Gerdes et al. | 212/39 R |
| 3,833,932 | 9/1974 | Hamilton | 340/267 C |
| 3,854,128 | 12/1974 | Yamagishi | 340/267 C |
| 3,922,789 | 12/1975 | Sarrell | 33/125 R |
| 3,932,855 | 1/1976 | Hamilton | 340/685 |
| 3,944,798 | 3/1976 | Eaton | 364/559 |
| 4,084,247 | 4/1978 | Ball | 364/559 |

Primary Examiner—John W. Caldwell, Sr.
Assistant Examiner—Joseph E. Nowicki
Attorney, Agent, or Firm—Lloyd B. Guernsey; W. William Ritt, Jr.; John F. Verhoeven

[57] ABSTRACT

A system for sensing the positon in space of the outer end of an articulated fluid loading arm while it is connected to a marine tanker or other transport vessel, and for sounding an alarm if the arm's operating envelope is exceeded. The sensing system includes means for determining various angles representative of the orientation of the booms or limbs of the arm, and a microprocessor for using these angles to compute the spatial position of the arm's outboard end. The boundaries between the safe and unsafe areas of operation of the arm are stored in a digital memory and compared with the actual position of the arm. The boundaries which define the safe areas can be any desired shape, and the shape can be readily changed by storing a new set of boundary values in the digital memory. If desired, the location of the boundaries can be made to depend upon the velocity of the arm as it is being maneuvered. When the outboard end of the arm moves into an unsafe area an alarm sounds, and the system is shut down if the arm moves a predetermined distance farther into the unsafe area.

19 Claims, 16 Drawing Figures

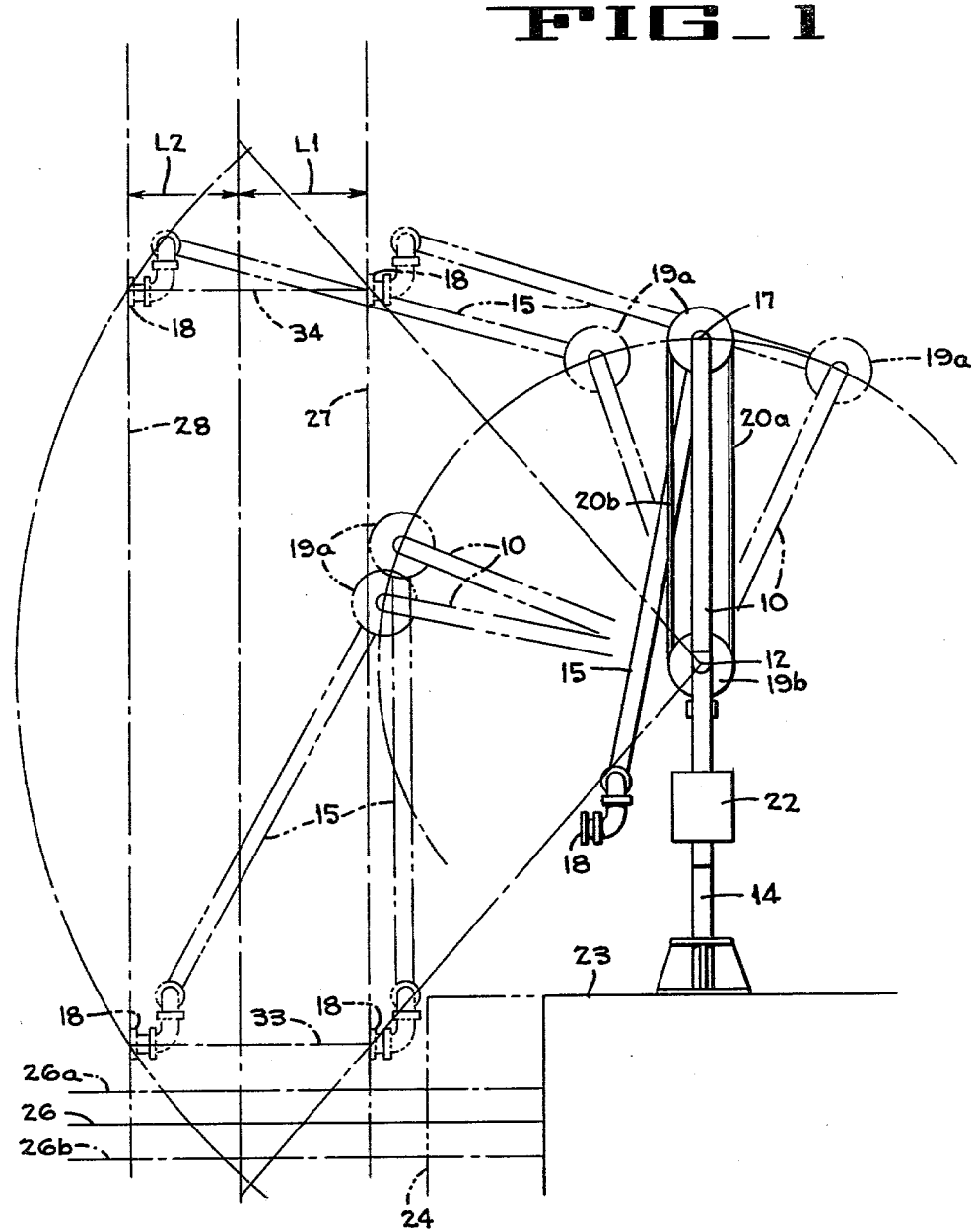

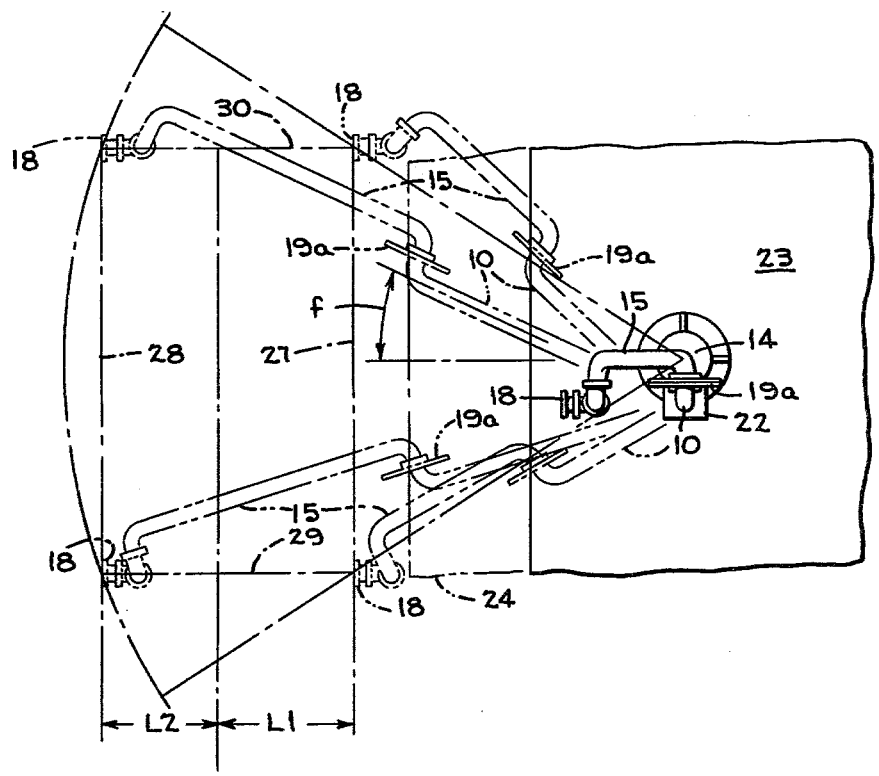
FIG_2
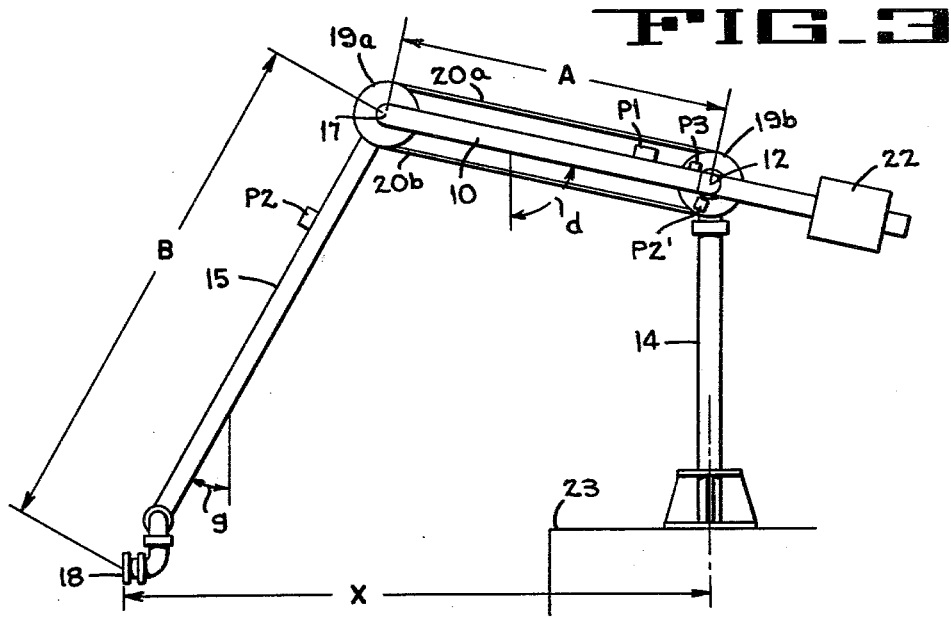
FIG_3

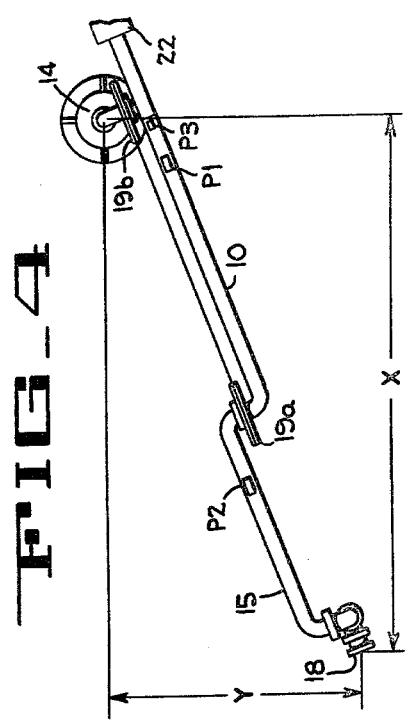
FIG_4
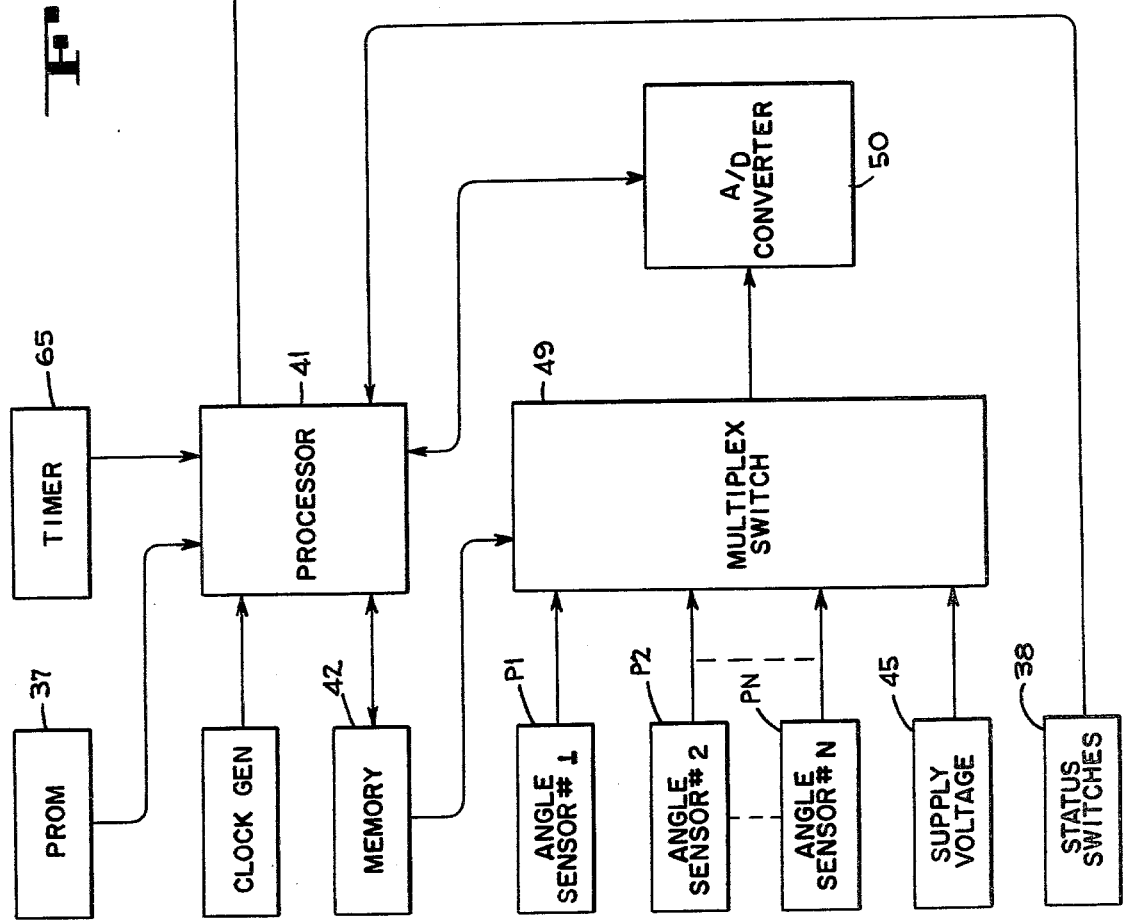
FIG_5

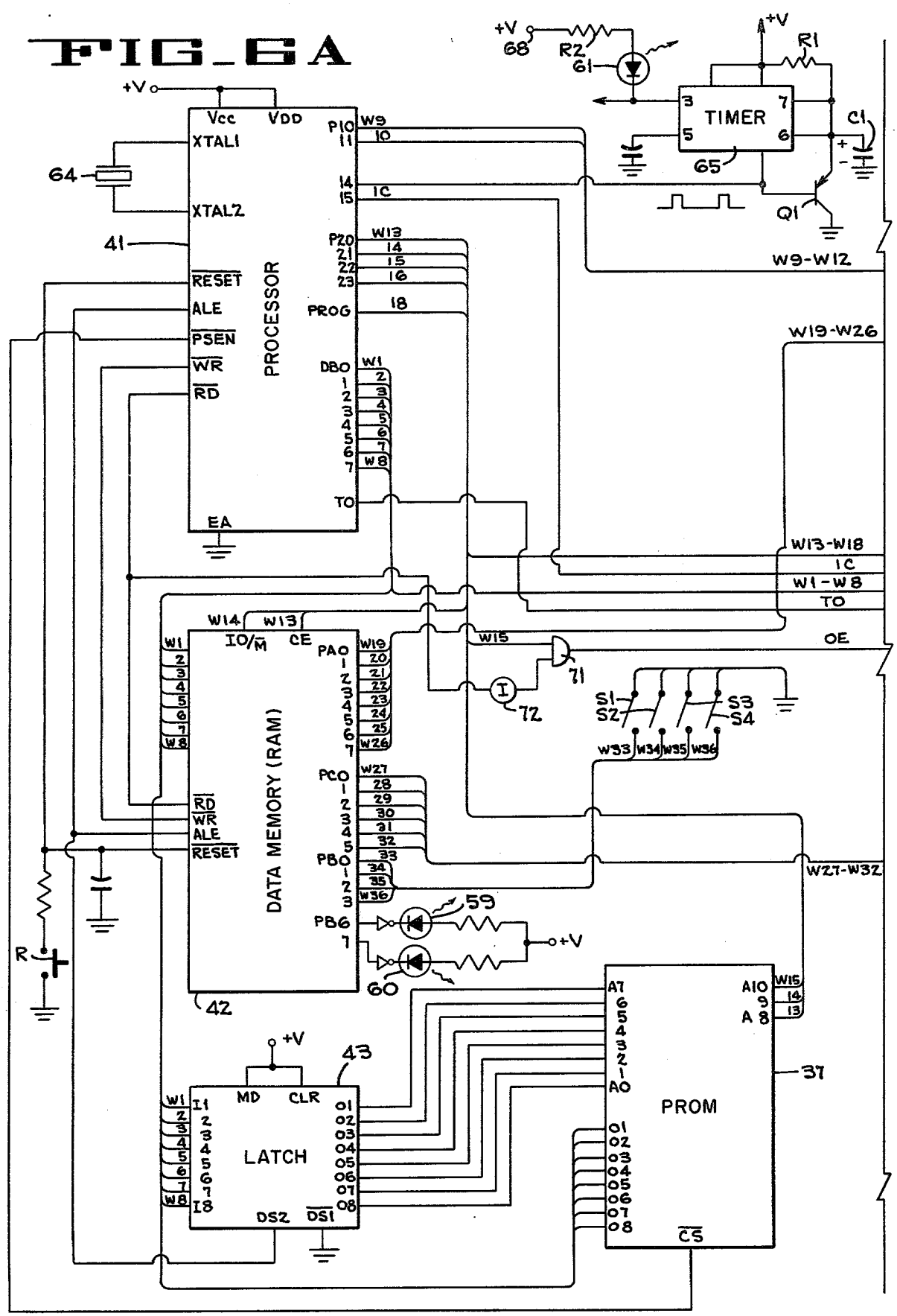

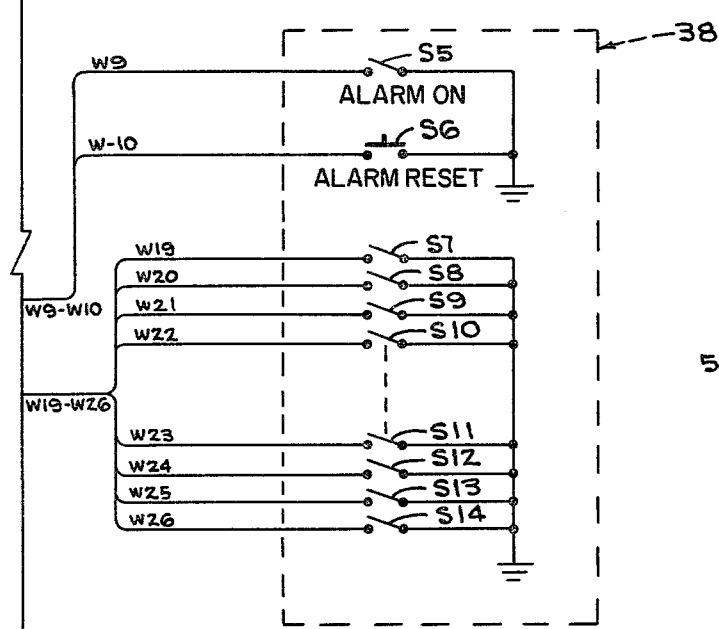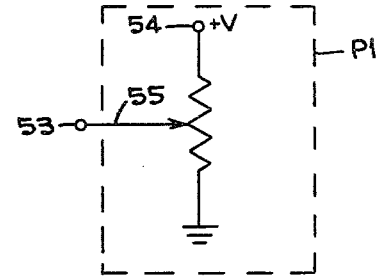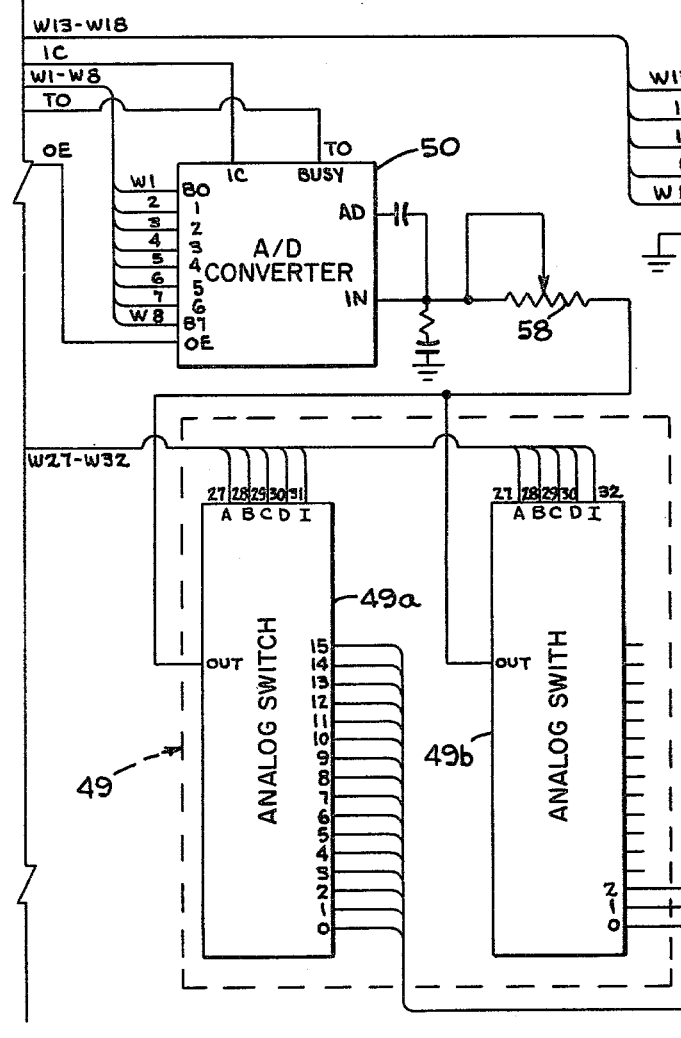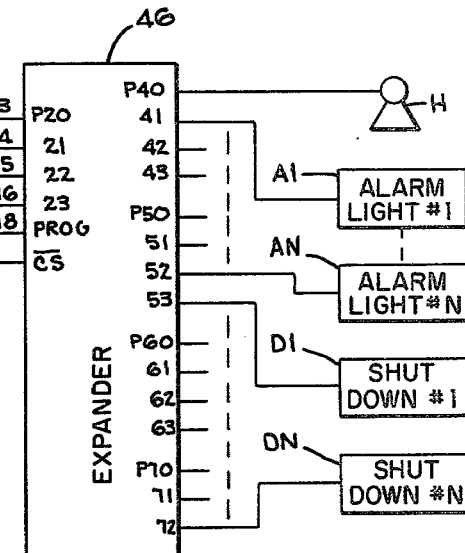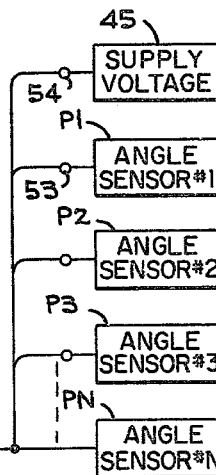

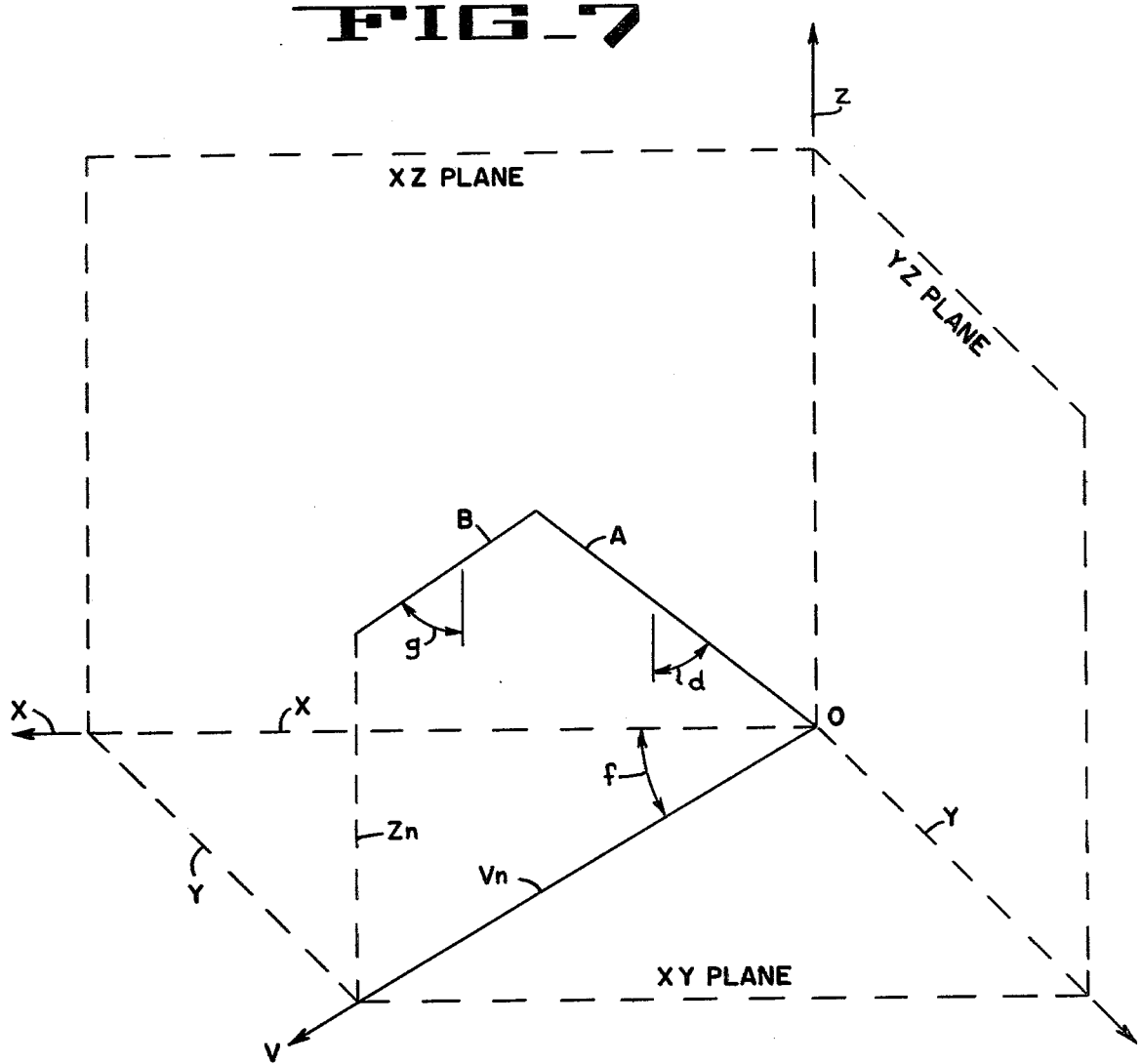
FIG_7
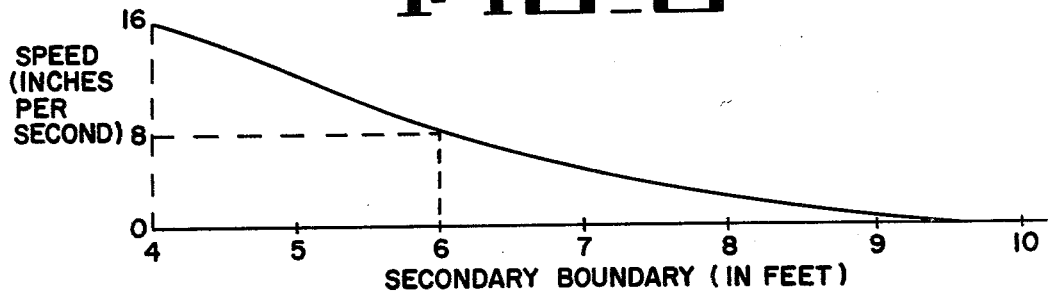
FIG_8

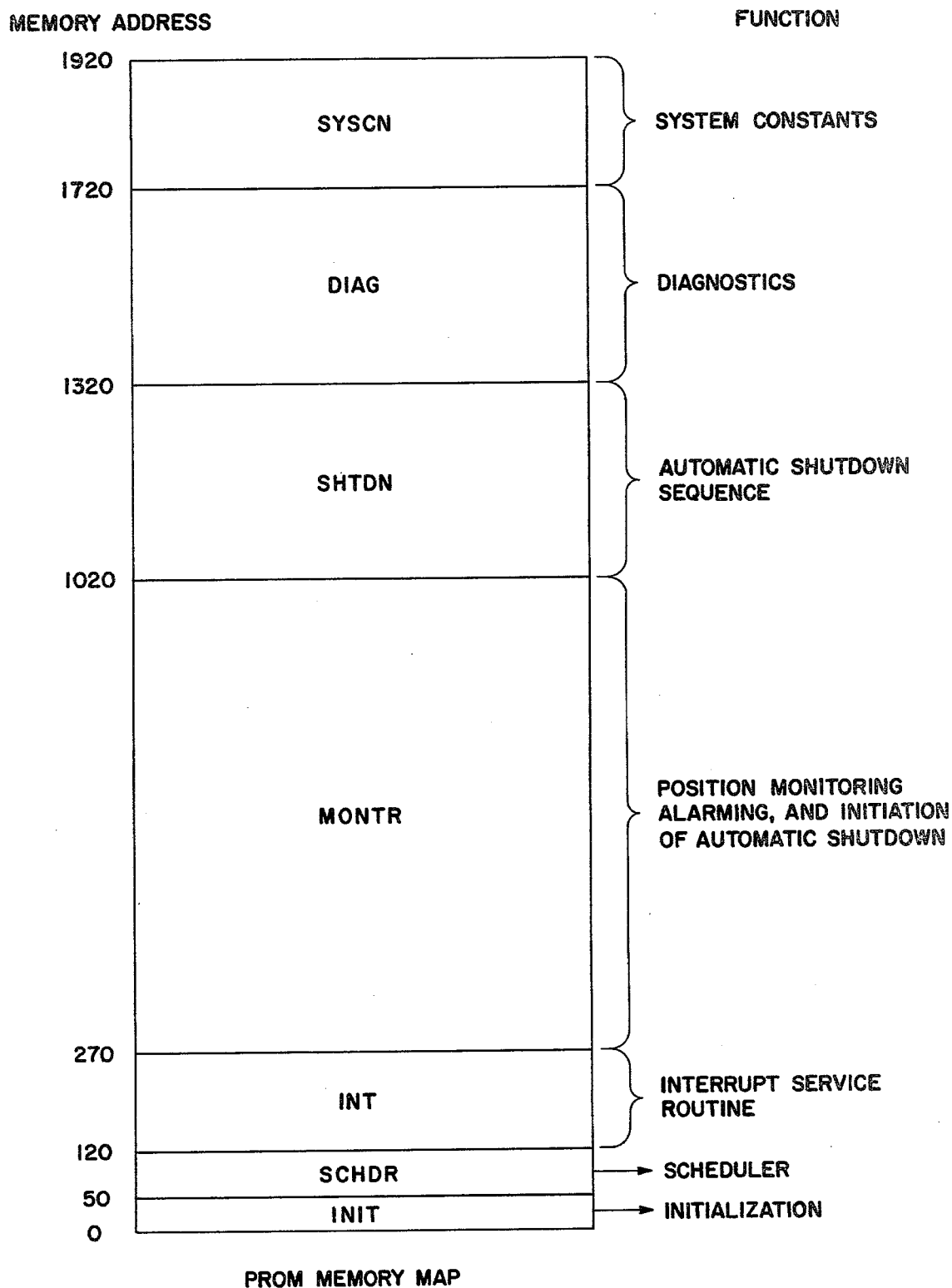
FIG_9
PROM MEMORY MAP

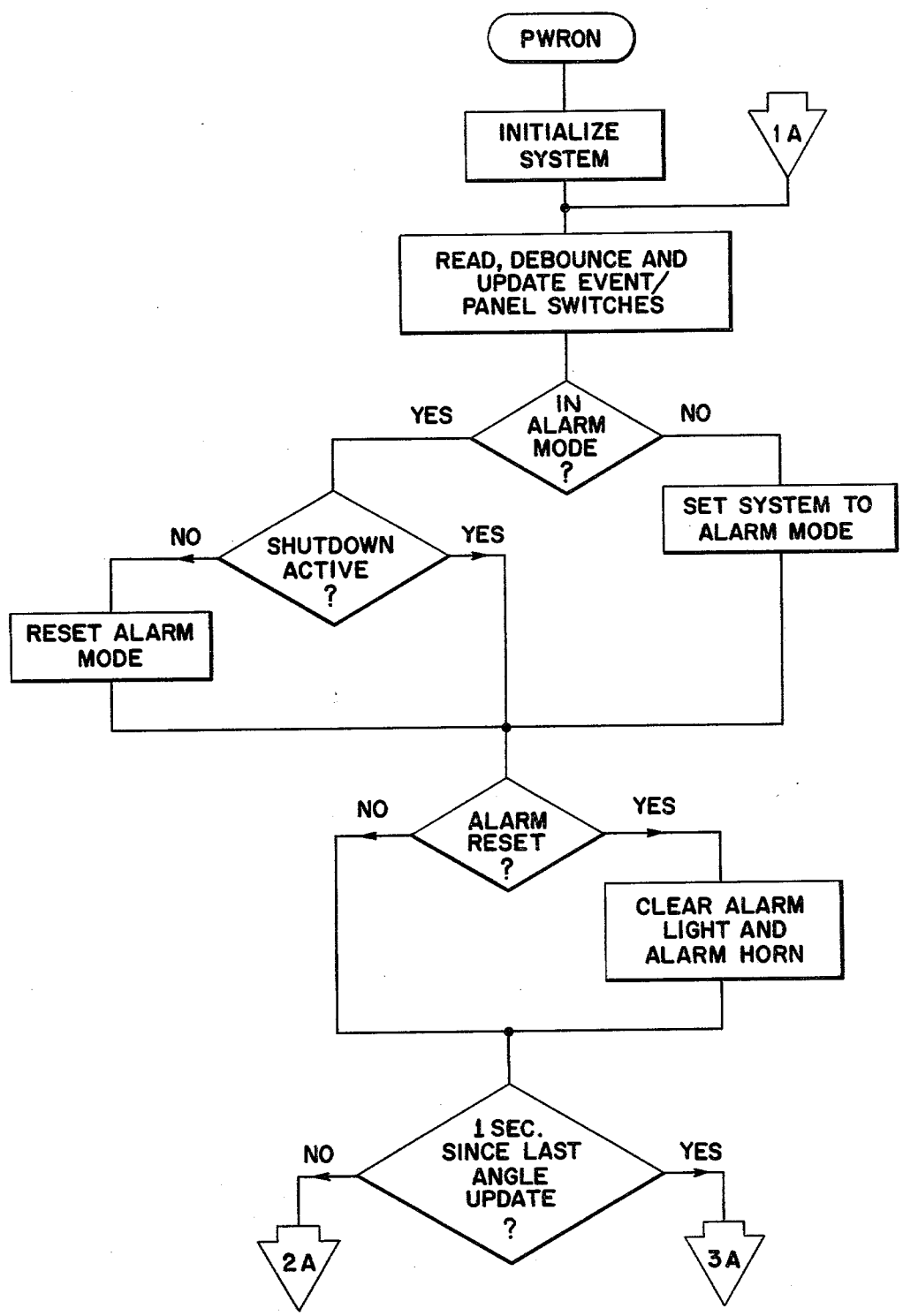
FIG_10

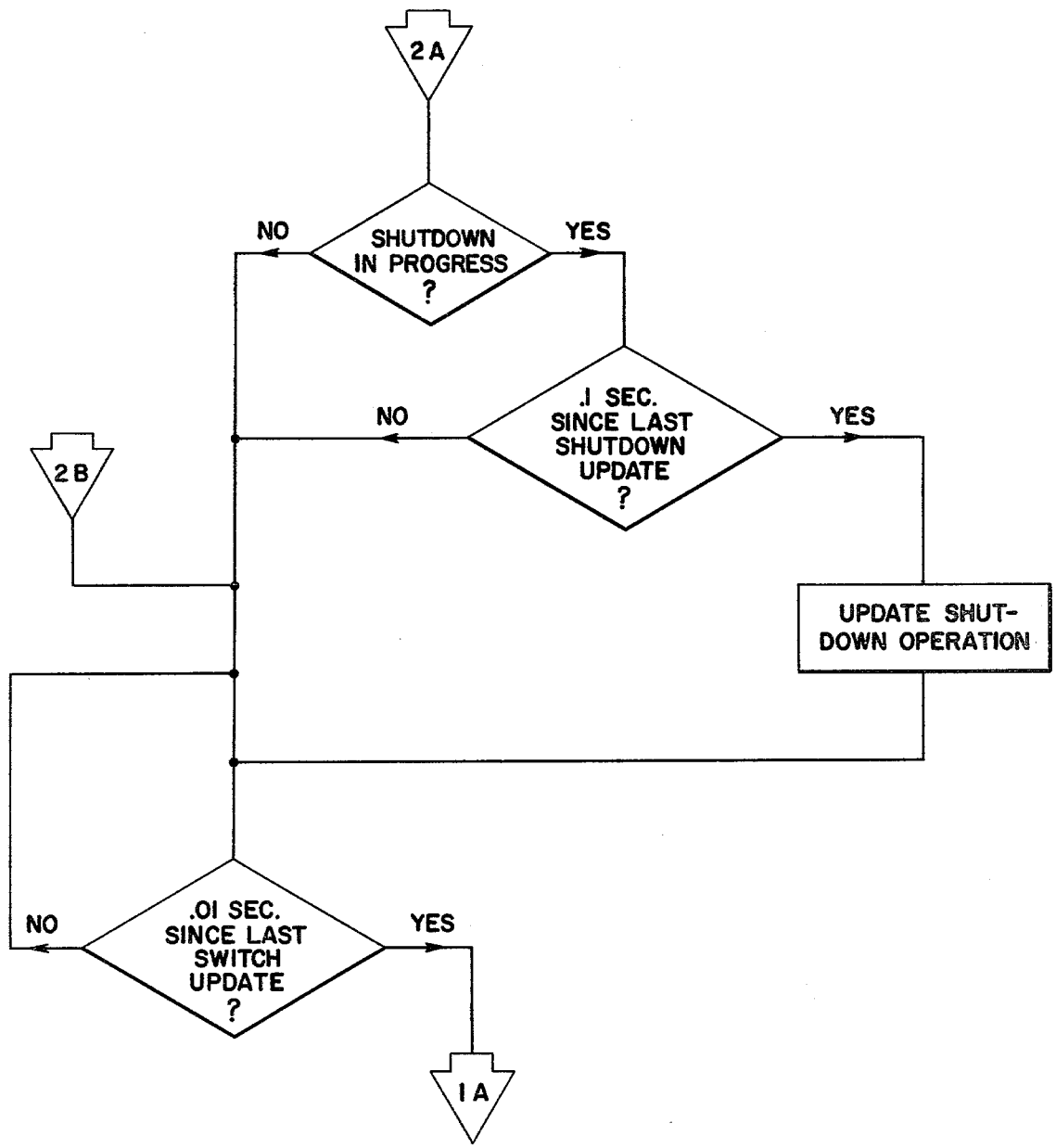

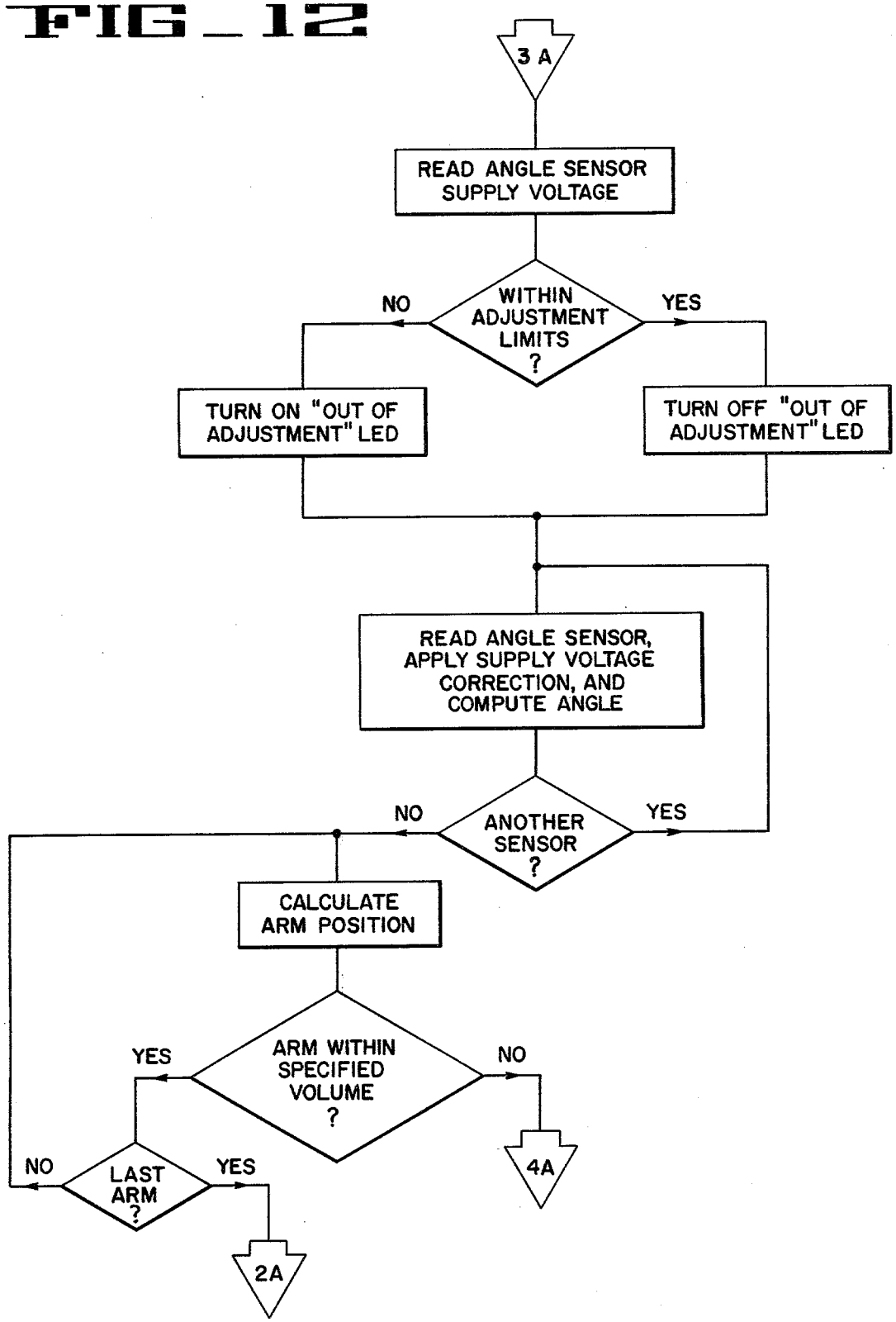
FIG_12

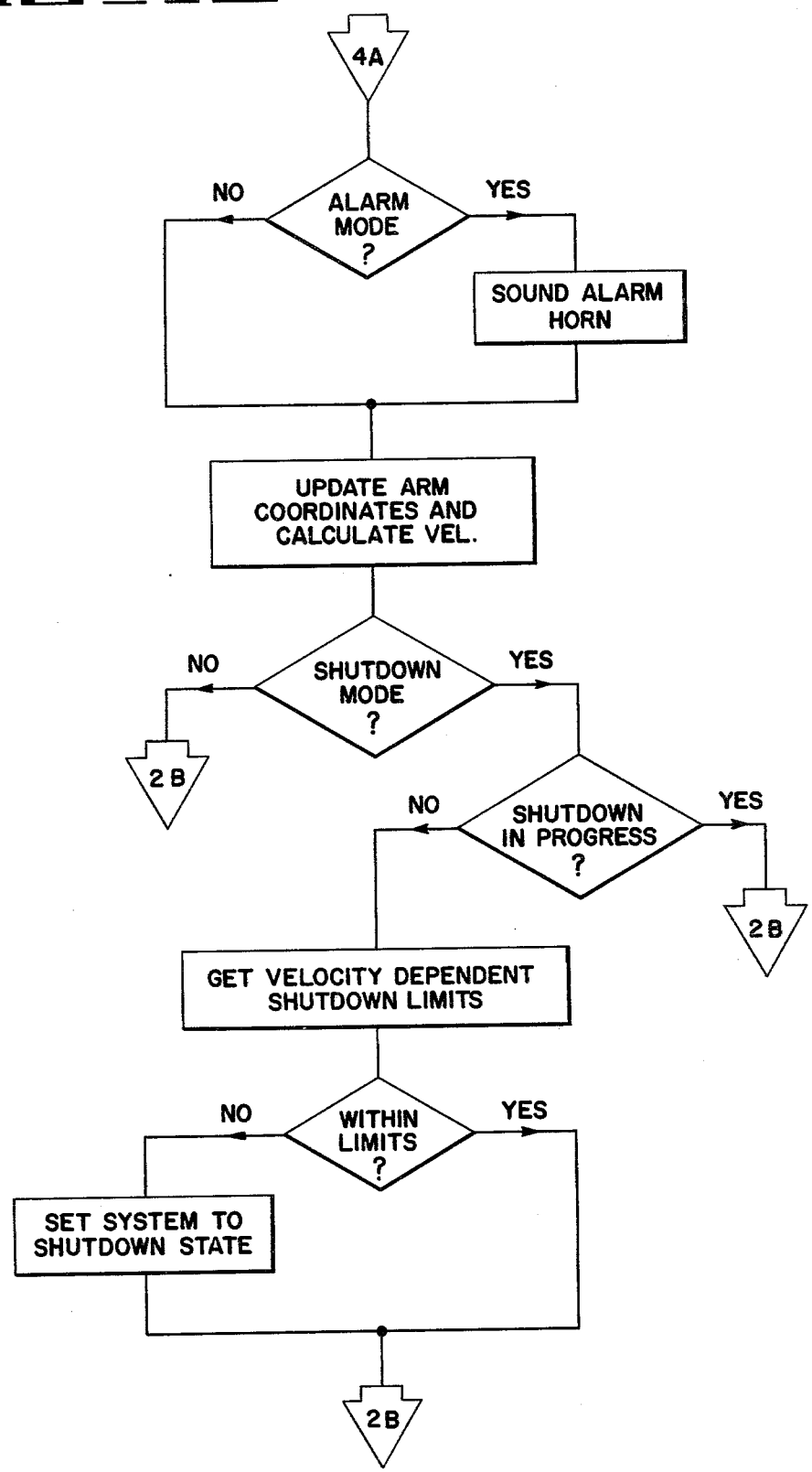
FIG_13

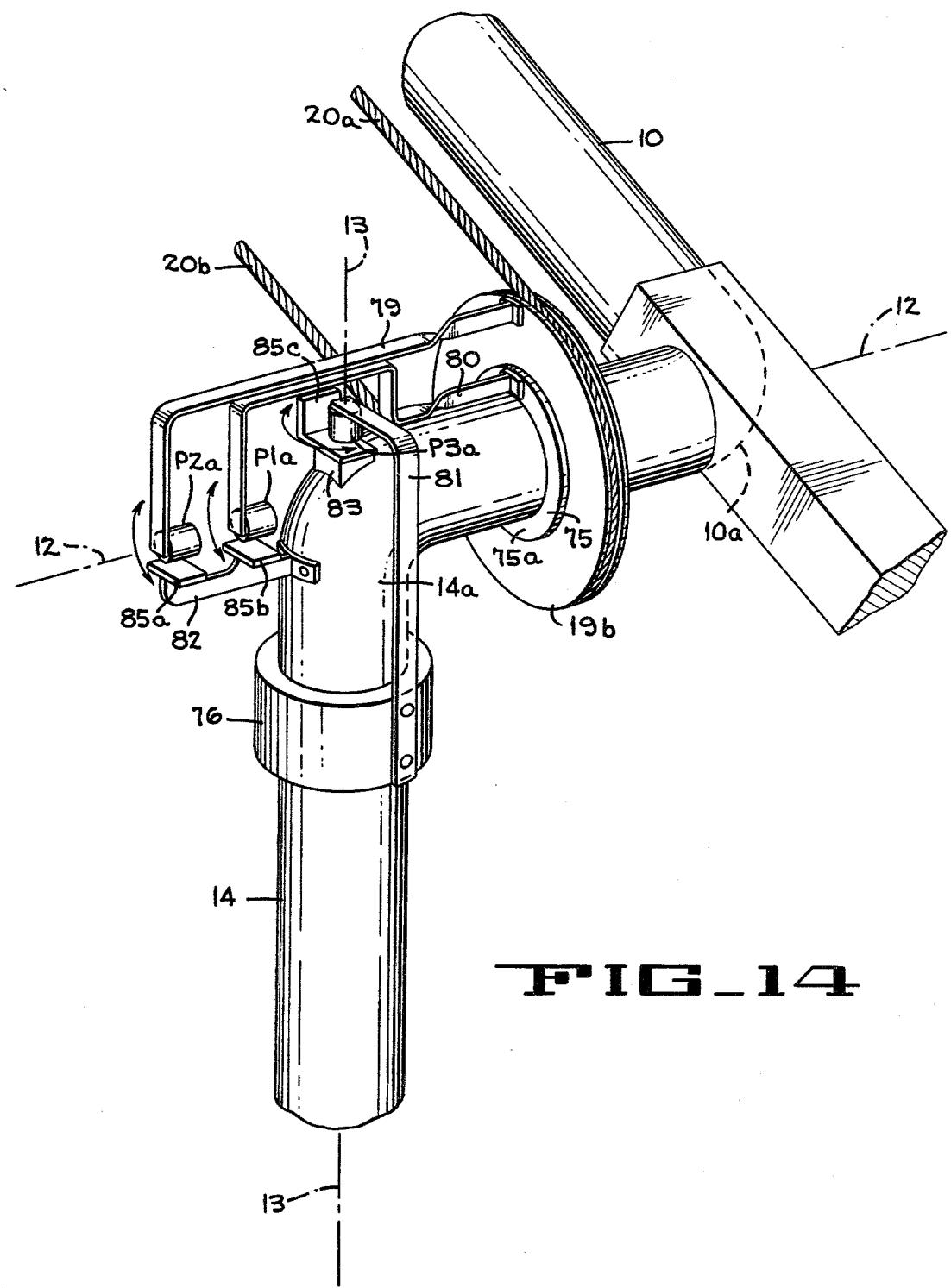
FIG_14

PROGRAMMABLE ALARM SYSTEM FOR MARINE LOADING ARMS

BACKGROUND OF THE INVENTION

1. Field of the Invention

This invention relates to articulated fluid transferring apparatus, and more particularly to marine loading arms and alarm systems for determining the spatial position of the outer end of such arms with respect to the arm booms or limbs.

2. Description of the Prior Art

Fluid loading arms constructed of articulated pipe are extensively used in the petroleum industry for transferring oil or other fluids between a jetty, wharf, or other loading station and a marine tanker moored alongside. Such an arm generally comprises an inboard boom or limb supported on a vertical riser pipe by pipe swivel joints to facilitate pivotal movement about horizontal and vertical axes, and an outboard boom or limb connected by a pipe swivel joint to the inboard limb so as to be pivotal relative thereto about a horizontal axis. The outer end of the outboard limb is adapted to be connected to a pipe manifold on a tanker located within the reach of the arm, such as by a remotely-controllable coupler device.

When an installation of this type is being designed, minimum requirements are set for the reach of the arm. These requirements are expressed in terms of the maximum horizontal displacement of the tanker parallel to and away from the jetty relative to a datum position, the maximum displacement away from the jetty due to variations in the distance between the tanker manifold and the tanker rail, and the maximum vertical displacement due to variations in the water level and the height of the tanker manifold relative to the water level. These displacements define a three-dimensional space that is rectangular in section when viewed in plan or in elevation, either parallel to or perpendicular to the jetty, and this space is known as the arm's "operating envelope". The arm must be able to accommodate all of these displacements so that a safe and secure connection to the tanker's manifold can be established and maintained within the limits of this envelope.

Most articulated arms are counterbalanced so that when empty they are substantially self-supporting. However, the weight of the oil or other fluid in the arm during use is not counterbalanced, and thus must be supported in part by the tanker manifold to which the arm is connected. Clearly, the stress on the manifold increases with the extension of the arm. In addition, the manifold always faces towards the tanker rail, and the stress to which the manifold can be subjected in a direction perpendicular to the rail, and hence to the jetty, is greater than the stress to which it can be subjected parallel to the rail. The stress parallel to the rail increases with an increase in the slew angle, that is the angle between the vertical plane in which the arm resides and the vertical plane through the riser and normal to the edge of the jetty. Thus, to prevent the stresses on the manifold from exceeding safe limits, the extension of the arm and the slew angle must be limited.

To achieve this limitation, alarm systems have been provided for actuation in the event of the angle between the inboard and outboard limbs exceeding a predetermined limit, or in the event of the slew angle exceeding a predetermined limit. These independent limits result in operating characteristics which are not entirely satisfactory, for they in effect define a space within which the arm can operate that is bounded either by arcuate surfaces or by planes passing through the vertical pivot axis of the arm on the riser. Thus, if a specified rectangular operating envelope is to be accommodated, fairly extensive areas outside this envelope will also be within the operating range of the arm, and the stresses which occur when the end of the arm is in these outside areas can substantially exceed those occurring within the envelope. It is therefore important that a system be provided for monitoring the actual position of the outboard end of the arm and for sounding an alarm whenever the end of the arm extends outside the specified envelope.

SUMMARY OF THE INVENTION

The present invention comprises a system for sensing the position in space of the end of an articulated fluid loading arm, the arm comprising a plurality of pivotally connected booms or limbs one of which is pivotally mounted on a vertical riser or other fixed support. The system includes means for sensing a first angle representative of the vertical orientation of one limb of the arm, means for sensing a second angle representative of the horizontal slew of the arm, means for sensing a third angle representative of the vertical orientation of the other limb or limbs, and means for deriving from the sensed angles an indication of the spatial position of the end of the arm.

The system further includes means for storing the spatial boundaries of a safe working area for the end of the loading arm, means for comparing the actual position in space of the arm with the safe boundaries and means for generating an alarm signal when the end of the arm reaches beyond any of the safe boundaries. When the arm continues to move beyond this first set of safe boundaries to a second set of boundaries, the system generates a shut-down signal which disables the loading arm.

BRIEF DESCRIPTION OF THE DRAWINGS

FIG. 1 is a schematic side elevation of an articulated fluid loading arm mounted on a jetty or wharf according to the present invention, illustrating in phantom the arm in several operating positions, and also showing the arm's operating envelope as viewed from the side.

FIG. 2 is a schematic plan view of the arm and operating envelope of FIG. 1.

FIG. 3 is a schematic side elevation of the arm of FIGS. 1 and 2 illustrating the arm's geometry from which the location of the arm's outer end can be derived.

FIG. 4 is a schematic plan view of the arm of FIG. 1, illustrating the arm's geometry in a horizontal plane.

FIG. 5 is a basic block diagram representation of the marine loading arm alarm circuitry.

FIGS. 6A and 6B comprise a schematic diagram of a microcomputer circuit which can be used to calculate the various positions of the end of the loading arm and compare these positions with the safe boundaries which are stored in the microcomputer memory.

FIG. 6C is a schematic diagram of an electronic device for sensing the attitude of the inboard and outboard limbs.

FIG. 7 is a diagrammatic representation of the arm of FIGS. 1 and 2, illustrating in three dimensional geometry the location of the arm's outer end in relation to the various angles which can be sensed.

FIG. 8 is a graph illustrating the relationship between loading arm velocity and the position of the shut-down boundaries.

FIG. 9-13 illustrate flow charts which can be used in understanding the operation of the microcomputer.

FIG. 14 is a perspective of a portion of a loading arm equipped with another embodiment of the present invention, for sensing the attitude of the inboard and outboard limbs of the arm.

DESCRIPTION OF THE PREFERRED EMBODIMENT

Referring to FIGS. 1-4 of the drawings, an articulated arm according to the present invention is shown comprising an inboard limb 10 pivotally connected about a horizontal axis at 12 to a riser or other fixed conduit 14. The articulated arm also comprises an outboard limb 15 pivotally connected about another horizontal axis 17 to the inboard limb, and a connecting device 18, such as a pipe flange or coupler, at the outer end of the limb 15 arranged for connecting the arm to a tanker manifold. A sheave 19a is fixed to the inboard end of the limb 15 and is mounted for pivotal movement about the horizontal axis 17 at the outboard end of the limb 10. The sheave 19a is coupled by a pair of cables 20a, 20b to another sheave 19b which is mounted for pivotal movement about the horizontal axis 12 at the upper end of the riser 14. The inboard sheave 19b can be rotated about the horizontal axis 12 by any of the means (not shown) commonly used for raising and lowering the outer end of the outboard limb 15. A counterweight 22 connected to the inboard limb 10 neutralizes or greatly reduces the tendency of the loading arm to turn about the horizontal axis 12 regardless of the position of the arm. The entire articulated arm assembly is mounted on a jetty 23 provided with a flexible fender 24.

The mean sea level is represented in FIG. 1 by the horizontal solid line 26, and the high and low water lines are represented by dash dot lines 26a, 26b respectively, above and below the line 26. The installation is designed to accommodate a variety of tankers and tanker movements during a loading operation. The arm's operating envelope is defined as being limited by the vertical planes 27, 28, 29 and 30, and horizontal planes 33, 34, as illustrated in FIGS. 1 and 2. However, it should be understood that the microcomputer can be used to define an operating envelope having any desired shape, and the actual arm position can be compared with such an operating envelope. All that is required is that the coordinates of the boundaries of such an operating envelope be stored in the memory of the microcomputer and the actual arm position compared therewith. Curved envelopes can be closely approximated by a series of short, straight lines.

As indicated in FIGS. 1 and 2, the freedom of movement between the planes 27 and 28 in the horizontal direction away from the jetty 23 is accounted for by the portion L1 which represents the variation in distance between the manifold and rail of various tankers, and a portion L2 which represents the allowable movement of a tanker towards or away from the jetty.

The freedom of movement between planes 33 and 34 in the vertical direction (FIG. 1) is accounted for by variations in sea level, variations in the height of the tankers, and variations in the height of a tanker manifold above sea level as the tanker is filled. The freedom of movement between the planes 29 and 30 (FIG. 2) is accounted for by allowable movements of the tanker parallel to the jetty. To accommodate these movements it must be possible for the connecting device 18 to reach a manifold located anywhere within the three dimensional operating envelope defined by vertical planes 27, 28, 29 and 30 and horizontal planes 33 and 34.

The phantom representations of the arm in FIG. 1 show the orientation of the limbs 10 and 15 when the arm is located in a vertical plane through the riser 14 and perpendicular to the edge of the jetty, and when the connecting device 18 is in each of the four corners of the rectangle defined by planes 27, 28, 33 and 34. It will be appreciated that if an indication is to be given when the connecting device 18 moves beyond the plane 28 for example, it is necessary to monitor both angles g and d (FIG. 3). If only one of these angles is monitored, it would not be possible to define the plane 28 so as to determine when the connecting device 18 moves beyond this plane. As should be readily apparent, when the arm is connected to a tanker manifold the stress on the manifold increases as the connecting device 18 moves away from the jetty 23.

FIG. 2 shows the horizontal orientations of the limbs 10 and 15 when the connecting device 18 is located at each one of the intersections between the planes 27, 28, 29 and 30. If, for example, we consider the connecting device 18 when at the intersection of planes 28 and 30, any increase in the slew angle f without a contraction of the arm would take the connecting device 18 beyond the plane 30. Although the vertical components of stress on the tanker manifold beyond the plane 30 would be no greater than if it were located at the intersection of planes 28 and 30, the lateral component of stress parallel to the vertical face of the jetty 23 would be increased and therefore the total combination of stresses would be unacceptable. Since the tanker manifold faces toward the tanker rail, this lateral stress component constitutes a shearing force and bending moment which can damage the manifold.

In order to provide the desired indication when a connecting device 18 moves outside the three dimensional operating envelope defined by the planes 27, 28, 29, 30, 33 and 34, sensors are arranged to monitor the angle d (FIGS. 3 and 7) to provide an indication of the vertical orientation of the limb 10 relative to the riser 14, the angle g to provide an indication of the vertical orientation of the limb 15 relative to the riser 14, and to indicate the slew angle f (FIGS. 2 and 7). The sensors may comprise a variety of transducers; for example, potentiometers absolute shaft encoders, or other known devices to provide analog outputs may be used to sense the angles d, g and f. The angles d and g may also be obtained by pendulum potentiometers P1 and P2 which are mounted on the respective limbs 10 and 15 (FIG. 3). One such pendulum potentiometer which may be used is the Model CP17-0601-1 manufactured by Humphrey, Inc., San Diego, Calif.

Since the sheaves 19a and 19b are positioned in a fixed relation to the attitude of the outboard limb 15, the outboard potentiometer P2 may be mounted on the sheave 19b at the position P2' (FIG. 3) where it will provide elevation angle readings identical to the readings obtained from a potentiometer mounted on the outboard limb. The electrical wiring may be simplified when the potentiometer is mounted on the sheave 19b. The potentiometer P1 can be mounted on the counterweight 22, if desired, to obtain the elevation angle of the counterweight and of the inboard limb 10. The slew angle f is obtained by a direction potentiometer or angle encoder P3 which is connected between the riser 14 and the inboard limb 10. One such encoder which may be used is the Model CP17-0646-1 manufactured by Humphrey, Inc.

The analog signals which are obtained from the various potentiometers can be converted to digital signals which are used by a microcomputer to compute the exact spatial position of the connecting device 18. The safe boundaries defined by the planes 27, 28, 29, 30, 33 and 34 are stored in the microcomputer memory, and these boundaries are continually compared with the actual position of the connecting device. When the actual position of the connecting device 18 reaches any of the boundaries of the safe area, the microcomputer provides a warning signal to an alarm device. If the connecting device 18 continues to move away from the safe area the microcomputer provides a shut-down signal which provides a warning signal to both the customer on the tanker and to the operator of the marine loading arm, so that the fuel pumps can be turned off, the proper valves can be closed and the connecting device 18 can be disconnected from the tanker manifold. If desired, the shut-down signal can be used to turn off the pumps and disable the arm. The distance which the connecting device moves outside the safe area before the warning signal is produced and the arm is disabled is determined by the velocity at which the connecting device changes location.

In addition to the values of the angles which must be measured, the lengths of the arm's inboard and outboard limbs 10, 15 must be used to calculate the spatial position of the outer end of the arm. These lengths, having a value of A and B respectively, are stored in the memory portion of the microcomputer which performs the calculations. The various angles and lengths used are shown in FIGS. 3 and 7, with FIG. 7 being a diagrammatic representation of one of the marine loading arms and illustrating in three dimensional geometry the location of the inboard and outboard limbs in relation to the various angles which can be measured by the sensors. FIG. 7 also shows the position of these angles and the lengths of the limbs in relation to the X, Y and Z locations in space which can be calculated from the readings of the sensors.

The position of the outboard end of the arm is calculated in two steps. First, the position of the connector flange in the plane of the arm is calculated using the origin O of the coordinates at the top of the riser and obtaining a point having the polar coordinate values of Vn, Zn as the location of the connector flange. The flange position is computed using the following relationships:

$$vn = A \sin d + B \sin g$$

$$Zn = A \cos d + B \cos g$$

Then, projecting the flange position onto the X, Y, Z axis, the rectangular coordinates of the flange position can be calculated using the following relationships:

$$X = Vn \sin f$$

$$Y = Vn \cos f$$

$$Z = Zn$$

Each of the quantities X, Y and Z is computed and compared with the boundary values, and an alarm is sounded if any limit is exceeded.

When the connecting device moves outside the safe boundaries by a predetermined distance a "shut-down" procedure is initiated to prevent damage to the arm and/or tanker manifold. The distance from the safe boundary at which the shut-down procedure is initiated is determined by the velocity of the connecting device. If desired, the location of the safe boundaries may also be made to depend upon the velocity of the end of the loading arm. An inner boundary may be defined and stored in the microcomputer memory and a warning sounded when an arm, moving at a maximum velocity, reaches the inner boundary. When the arm is moving at a speed less than the maximum a "look-up" table, stored in memory, provides an extension value to be added to the inner boundary. This look-up table is similar to the graph of FIG. 8 and is used in the manner discussed above, in connection with the shut-down boundaries.

The number of steps in the shut-down procedure and the action to be taken in each of these steps may vary due to the wishes and requirements of the customers who are using the marine loading arm. In some cases the shut-down procedure which is provided by the present invention may consist only of providing a shut-down signal to the customer, while in other cases a more elaborate procedure is required. In any case, the microcomputer can be programmed to provide a desired signal or sequence of signals to the customer. Details of the microcomputer circuits which perform these operations are described in detail below.

FIG. 5 is a block diagram representation of the basic circuitry of the programmable marine loading arm alarm system of the present invention. Details of the circuit can be seen by referring to FIGS. 6A and 6B, where FIG. 6A comprises the computer section of the circuitry and FIG. 6B comprises the input, output and analog-digital converter sections of the circuitry. The leads in FIGS. 5, 6A and 6B represent single wires when these leads include square corners, and represent cables having a plurality of wires when rounded corners are shown in the leads.

In the embodiment of the invention diagrammatically depicted herein, a program memory 37 (FIGS. 5, 6A) stores the length of each of the limbs 10, 15, the X, Y, Z coordinates of all of the safe boundaries for the connecting device 18, and also a program to be executed by the processor. A plurality of angle sensors P1–PN (FIGS. 5, 6B) provide elevation and slew information to a microprocessor 41 (FIGS. 5, 6A) which stores this information in a data memory 42, and a plurality of status input switches 38 supply status data to be loaded into the data memory 42.

The microprocessor 41 includes a small scratch pad memory which can be used to temporarily store data to be processed, an accumulator which performs the operations of manipulating data, and a program counter which stores the address of the step of the computer program that is being executed. One microprocessor which may be used in the circuit of the present invention is the 8035 which is built by the Intel Corporation, Santa Clara, Calif. Details of the 8035 processor may be found in the "MCS-48 Microcomputer User's Manual", 1976, by Intel Corporation.

The program memory 37 may be a programmable-read-only-memory or PROM which is available from several manufacturers. A series of instructions, comprising the program and the lengths of the limbs, may be loaded into the program memory 37 by the manufacturer of the PROM, or the PROM may be loaded by a "PROM programmer" which is available from several manufacturers. The contents of the program memory 37 cannot be changed by the microprocessor 41. The memory contents can only be changed by removing the PROM from the circuitry of FIG. 6A and inserting it into the PROM programmer where the data may be removed from the memory and new data stored in the memory. One PROM which may be used in the present invention is the 2708 made by the Intel Corporation, and such PROM is described in the Intel 1976 Data Catalog.

The general storage areas of the PROM 37 as used in the present invention may be seen in FIG. 9. Relatively small portions of the PROM are used to store instructions for initializing and scheduling the operation of the microcomputer. Another section is used to store a routine which is used if service is to be interrupted. The largest portion of the PROM is reserved for the program which monitors the various sensors on a regular schedule, calculates the positions of the arm limbs and, if necessary, provides alarm signal and/or provides an automatic shutdown and disconnecting of the arm. A relatively small diagnostic program, and system constants such as lengths of the arm limbs, are also stored in the PROM. The details of the use of the contents of the PROM will be discussed hereinafter.

Information which is stored in the PROM 37 is retrieved by providing memory address signals on the address inputs A0-A10. The lower 8 bits of the address are latched in an 8-bit latch 43 and coupled to the inputs A0-A7 of the PROM while the remaining bits of the address are continuously supplied by the microprocessor and do not need to be latched. The lower 8 bits on the inputs I1-I8 are stored in the latch 43 when a strobe pulse is provided by the ALE lead of the processor 41 to the DS2 input of the latch 43. These signals are retained in the latch 43 and are continuously available on the output leads 01-08 of the latch. One such latch which can be used in the present invention is the 8212 made by the aforementioned Intel Corporation. Details of this latch may be found in the aforementioned MCS-48 Microcomputer User's Manual, 1976, by Intel Corporation.

The data memory chip 42 may include a random access memory or RAM having discreet addressable locations, each of which provides storage for a word. The word may be for data and may contain specific fields useful in a variety of operations. Normally, when the processor is in need of data or instructions, it will generate a memory cycle and provide an address to the program memory or to the data memory. The data or word stored at the addressed location will subsequently be retrieved and provided to the processor 41. The data memory chip 42 also includes an I/O expander (input-output expander) section which increases the number of input/output ports which are available for use by the processor 41. The I/O portion of the chip 42 provides control signals for other portions of the computer circuitry. One such data memory and I/O expander which can be used with the present invention is the 8156 made by the aforementioned Intel Corporation.

In order to increase the number of output devices, such as alarm lights and shut-down devices which may be individually controlled by the microprocessor 41, an I/O expander 46 is connected to the processor 41. The expander includes one 4-bit input port (P20-P23) which is connected to the corresponding leads P20-P23 in the processor. The expander 46 includes a total of 16 input/output leads which can be used to provide individual signals to or from a total of 16 input/output devices. The expander is capable of providing relatively large values of output current to these output devices. Therefore, in addition to increasing the number of output devices which can be controlled by the microprocessor 41, the I/O expander can operate devices requiring signal currents which are larger than the current which is available directly from the processor. One such I/O expander which can be used in the present circuitry is the 8243, also built by the aforementioned Intel Corporation. Details of the 8243 I/O expander may be found in the aforementioned MCS-48 Microprocessor User's Manual.

Signals from the angle sensors P1-PN and from the supply voltage 45 are coupled to a plurality of input leads on a multiplex switch 49. These signals are coupled, one at a time, through the multiplex switch 49 and applied to an analog-to-digital (A/D) converter 50 which changes the analog signals into 8-bit digital signals for use by the processor 41. The multiplex switch 49 includes a pair of analog switches 49a, 49b (FIG. 6B) each having a plurality of input leads and a single output lead. Selection of the input signal to be coupled to the output lead is made by control signals applied to the select control leads A, B, C, D and I of each of the analog switches. One such analog switch which may be used is the CD 4067BE made by the RCA Corporation, and details of these switches may be found in the RCA CMOS Manual.

The A/D converter 50 includes a single input lead which receives analog signals, and a plurality of output leads which deliver corresponding 8-bit binary signals. The converter starts the conversion process when a signal is received on the IC or "initiate conversion" lead. During the time that the conversion is in process the converter 50 develops a "busy" signal which is coupled to the processor 41. When the busy signal disappears the processor 41 provides a fetch signal to one input of an AND-gate 71 (FIG. 6A) and provides an RD (output strobe) signal through an inverter 72 to the other input of the gate 71. These signals combine to provide an OE (output enable) signal which transfers binary data signals to the outputs B0-B7 of the converter 50. One such A/D converter which can be used in the present invention is the 8703 made by the Teledyne Semiconductor Company, Mountain View, Calif., and details of this converter can be found in the specification sheets on it that are available from this company.

The details of the angle sensors, for example, the sensor P1, may be seen in FIG. 6C. The sensor comprises a potentiometer having one end 54 connected to a source of positive voltage, such as a +12 volts, and the other end thereof connected to a ground reference. An arm 55 is slidably positioned along the potentiometer with the position of the arm being determined by the attitude of the limb of the marine loading arm to which the potentiometer is attached. The voltage at an output terminal 53 is determined by the position of the arm 55. This voltage is coupled to the microprocessor 41 which uses the value of the voltage to calculate the position of the loading arm limb on which the potentiometer is mounted. It can be seen that if the voltage at the terminal 54 of the potentiometer were to change, the microprocessor 41 would obtain a false value for the position of the limb. To prevent this from happening, the voltage from the terminal 54 is coupled to the processor 41 and compared with a standard value so that a correction can be calculated by the processor if the value of the supply voltage at terminal 54 should change, and this connection is used to correct the value from the terminal 53.

A signal level control 58 can be used to adjust the value of the analog signals at the input of the A/D converter and thus compensate for any changes in operating characteristics of the circuitry of FIGS. 6A, 6B and/or for changes in power supply voltage. This adjustment is usually made soon after the equipment is turned on, but it may also be made at other times. The adjustment is accomplished by coupling a voltage, such as +12 volts from a supply voltage source 45 (FIGS. 5, 6B), through the analog switch 49a to the input of the A/D converter 50 and adjusting the signal level control 58 until the processor 41 receives a predetermined standard signal, such as all binary 1's from the converter. If the signal from the converter 50 is less than the standard value by a predetermined amount, the processor 41 causes the I/O section of the data memory chip 42 to provide a warning signal to energize a light emitting diode or LED 59. The control 58 is then adjusted until the LED 59 is deenergized.

Next the zero or ground reference value of voltage at an input of the analog switch 49b is coupled to the input to the A/D converter 50 and converted to a digital signal which should be all binary 0's, or at least a low value. If the signal from the converter 50 is greater than the zero value by a predetermined amount, the processor 41 causes the data memory to provide a warning signal to energize another LED 60. The signal level control 58 can be adjusted until both LED 59 and LED 60 are deenergized to compensate for any change in operation of the circuitry of FIGS. 6A, 6B.

The microcomputer circuitry includes a crystal 64 (FIG. 6A) which is used to develop the clock and other timing signals. These timing signals are continuously monitored by a watchdog timer 65 which provides a warning signal on the output lead #3 when timing signals are not received at the normal rate. In the present invention the crystal 64 and processor 41 develop timing pulses at a rate of one per second and scan each of the sensors to obtain angle readings once per second. The timing pulses are coupled to the timer 65 and the transistor Q1 with the time between pulses being approximately 1 second. During the time between pulses, current flows from a source of potential +V, through a resistor R1, to charge a capacitor C1 with the polarity shown in FIG. 6A. The value of the voltage on the capacitor C1 is determined by the time the capacitor charges, which is the time between pulses. Each time a positive timing pulse is applied to the base of the transistor Q1 the capacitor C1 discharges through the transistor. However, if capacitor charges for more than 1 second the voltage on the capacitor C1 increases to a high value, causing the timer 65 to provide a low value of voltage at the output lead 3. The low value of output voltage at the cathode of an LED 61 and the positive voltage at a terminal 68 cause the LED 61 to be energized and to warn the operator that the processor is not providing the proper timing pulses. One timer which can be used in the present invention is the NE555 which is available from several manufacturers.

A plurality of switches S1–S4 (FIG. 6A) provide test signals for performing diagnostic checks on various portions of the microcomputer system and on the sensing devices. These switches are used in conjunction with a diagnostic program which is stored in the PROM 37. The test switch S1 is used in checking the value of the supply voltage for the system and in adjusting the signal output level of the A/D converter 50 (FIG. 6B). When the test switch S1 is closed, the voltage from the supply voltage 45 is coupled to the processor and the signal level control 58 adjusted as described hereinbefore to obtain a standard signal from the output of the A/D converter 50.

When the test switch S2 is closed, a test program from the PROM 37 (FIG. 6A) provides test signals to the alarm lights A1–AN (FIG. 6B). These test signals can be applied one at a time to the alarm lights, followed by other desired combinations of test signals to various alarm lights. The PROM 37 can be programmed to provide any combination of tests desired by the operator of the alarm system.

When the test switch S3 is closed, a test program from the PROM 37 causes the expander 46 (FIGS. 5, 6B) to supply test signals to the shut-down circuits D1–DN, with the desired combination of test signals being written into the test program. When the test switch S4 is closed, the processor 41 checks the positions of the event switches S7–S14 (FIG. 6B) and displays the open or closed status of each of these switches on the alarm lights A1–AN.

The operation of the microprocessor circuit will now be described in connection with the circuit of FIGS. 6A, 6B, the PROM memory map of FIG. 9, and the flow charts of FIGS. 10–13. When power is initially applied to the microcomputer circuit of FIGS. 6A, 6B, or when a reset push-button switch R (FIG. 6A) is closed, the low value of voltage from the processor 41 or from the switch R applied to the $\overline{\text{RESET}}$ leads of the processor 41 and memory 42 clears all data from the data memory 42 and from the scratch pad memory of the processor 41, sets the program counter of the processor to zero, and clears the program counter stack. An "alarm on" switch S5 is then closed to turn on the alarm system, so the alarm devices will be energized when any of the connecting devices in a bank of arms move outside the safe operating boundaries.

The clock generator in the processor 41 provides clock pulses which cause the processor to move through the program sequence, starting with step #1. The program, which is contained in the program memory 37, is moved to the processor 41 by the procedure of having the processor 41 send a fetch command over the lines W1–W15 to the PROM 37. The PROM sends the program instructions, one at a time, starting with instruction #1, from the program memory to the processor 41 where they are executed.

The instructions in the program call for the processor to retrieve and store the data which is provided by the switches S5–S14 (FIG. 6B), by the supply voltage 45, and by the angle sensors P1–PN. In order to retrieve this data the processor sends out a data request signal and the address of one of the input ports in the computer to which the data is to be sent. If the data is to be received from one of the switches S5–S14, the signal is sent from one of the input ports P10–P23 (FIG. 6A).

To receive data from any of the angle sensors P1–PN or from the supply 45, the processor sends out an IC (initiate conversion) signal to the A/D converter 50 (FIGS. 5, 6B) and sends select signals through the memory and I/O expander 42 (FIG. 6A) to the select lines 27–32 of the analog switches 49a, 49b. The select signals cause one of the sensors to be coupled through the multiplex switch 49 to the input lead of the A/D converter. The A/D converter 50 responds to the IC signal with a busy signal and starts the process of converting the analog data signal into an 8-bit binary signal. When the conversion is complete the busy signal disappears and the processor 41 directs an OE (output enable) signal to the converter 50. The converter responds by delivering the 8-bit binary data signal to the processor 41, and the processor stores the data signal in the data memory 42 (FIGS. 5, 6A) for later use in calculation of the loading arm position. This process is repeated for each of the sensors, with the first data signal being received from the supply voltage source at the beginning of each of the reading cycles.

The value of the supply voltage from the terminal 54 (FIGS. 6B, 6C) is retrieved by the processor 41 and the binary value compared with a binary value representing the standard value of the supply voltage. Any variation from this standard value is stored in the data memory 42 and used by the processor 41 to correct readings from each of the angle sensors P1-PN. As can be seen in FIG. 6C, when the supply voltage at the terminal 54 changes from the standard value, the signal voltage at the sensor output terminal 53 changes by a corresponding amount and could produce a false value of the sensor angle. However, the correction generated by the processor 41 insures that correct sensor angles are calculated in spite of power supply voltage variations.

After the correct values of the sensor angles are obtained, the processor 41 retrieves the values of the limb lengths from the PROM 37, retrieves correct angle position data from the data memory 42, and proceeds to calculate the X, Y and Z positions of each of the loading arms. The end position of each of the loading arms is compared, one at a time, with the safe boundaries for the corresponding arm. When any arm is outside any of the corresponding safe boundaries an alarm signal is provided to the expander 46 (FIG. 6B), causing the horn H and an appropriate alarm light to be energized.

When the loading arm extends outside the safe boundaries the processor takes an additional reading from each of the sensors, calculates a new arm position, and uses the new arm position and the previous arm position to calculate the distance the arm has moved. Since readings are taken at one second intervals, the distance moved between readings is also the speed of the arm in the distance moved per second. The processor then compares the arm speed with a data table in the PROM 37 to determine how far outside the safe boundary the arm can extend before initiating a shutdown. A portion of the data table from the PROM is reproduced in graph form in FIG. 8. For example, when the speed of the end of the arm is 8 inches per second the arm may extend 6 feet outside the boundary before the arm is shut down. As long as the arm extends outside the safe boundary the alarm H continues to sound and the corresponding warning light A1-AN remains energized. The various steps of reading the sensors, calculating the positions of the loading arm limbs, and sounding the alarm can be seen in the flow chart of FIGS. 10-12.

As stated hereinbefore, the shut-down procedure can be varied to satisfy the wishes of a customer. For example, one such procedure may be as follows:

1. Provide a control closure signal to the customer to instruct him to turn off the fuel pumps by providing a closure signal to the shut-down circuit D1 of FIG. 6B.

2. The customer closes switch S7 to signal the turn-off of the fuel pumps.

3. The closed switch S7 causes the microcomputer to turn on power to the hydraulic system so that the loading arms may be operated.

4. The microcomputer provides a control signal which closes the ball valves at the outboard end of each loading arm to prevent oil spills.

5. The closing of the ball valve also closes switch S8 to signal the microcomputer that the ball valve is closed.

6. The microcomputer provides a control signal which opens the couplers on all of the loading arms.

7. The operator moves all of the loading arms away from the tanker and into the stored position adjacent the risers. It is also possible to program the microcomputer so that the loading arms are moved into the stored position by control signals from the microcomputer so that operator control is not required.

Several of these steps may be monitored by closing other of the switches S9-S14 if desired. If more status input switches are needed they can be added to the switch 38, and additional I/O expanders 46 can be connected to the processor to control additional shut-down circuits if such circuits are needed.

Another embodiment of the present invention is disclosed in FIG. 14, wherein all of the angle sensors are mounted on the riser 14, and wherein only the upper portion of the riser and the inner end of the loading arm's inboard limb 10 are shown. All of the remaining portions of this embodiment of the invention are identical to the embodiment shown in FIGS. 1-13. The basic details of the means of mounting the loading arm on the riser are shown in FIG. 14.

In the embodiment of FIG. 14, the inboard end of the limb 10 includes an elbow 10a which is welded or otherwise connected to a swivel joint 75. A flange 75a of the joint 75 is fixed to the elbow 10a, with the flange 75a free to rotate about the outer end of an elbow 14a. The lower end of the elbow 14a is pivotally connected to the upper end of the riser 14 by another swivel joint 76. Thus, the flange 75a rotates about the horizontal axis 12 when the outer end of the limb 10 is raised or lowered. The swivel joint 76 is mounted with its axis in alignment with the vertical axis 13 so that the lower end of the elbow 14a is rotatable about the axis 13. The sheave 19b is mounted for rotation about the axis 12 independently of the inboard limb 10 and its elbow 10a.

An encoder support bracket 79 has one end thereof connected to the sheave 19b, and the other end supports an absolute angle encoder P2a which is aligned coaxially with the horizontal axis 12. Another support bracket 80, mounted on the flange 75a, supports an absolute angle encoder P1a that also is coaxially aligned with the axis 12. A third support bracket 81 extends upward from its mounting on the outer portion of the riser swivel joint 76 and supports an absolute angle encoder P3a that is coaxially aligned with the riser's vertical axis 13. A magnet support bracket 82, mounted on the elbow 14a, supports a pair of magnets 85a, 85b which are positioned immediately below and adjacent the encoders P2a, P1a respectively. Another magnet support bracket 83, likewise mounted on the riser elbow 14a, supports a magnet 85c which is positioned adjacent the encoder P3a.

The absolute angle encoders P1a, P2a, P3a and the magnets 85a, 85b, 85c operate in the following manner. A ferrite inner portion of an encoder is always aligned toward the magnet which is mounted adjacent the encoder, so that as the encoder is rotated about a center axis the encoder provides an output signal representative of the amount of rotation from a fixed position. For example, when the arm's inboard limb 10 (FIG. 14) is oriented horizontally the inner portion of the encoder P1a is in a "zero position" and provides a signal representing this position. As the outer end of the limb 10 is raised, the elbow 10a, the flange 75 and the encoder P1a rotate clockwise as viewed from the left of FIG. 14, causing the encoder to provide a signal which continuously provides the attitude of the limb 10. Such encoders are available from several manufacturers, and one encoder which can be used in the present invention is the Model GCC-43-13H30 made by Litton Industries, Chatsworth, Cal.

When the inboard sheave 19b (FIGS. 3, 14) is rotated, by means not shown, to raise or lower the outer end of the limb 15 (FIG. 3), the bracket 79 and thus the encoder P2a rotate about the horizontal axis 12, thereby providing an output signal which represents the attitude of the outboard limb 15. When the marine loading arm is rotated (slewed) in a horizontal direction about the vertical axis 13 (FIGS. 4, 14), the magnet 85c rotates relative to the slew encoder P3a, causing the encoder P3a to provide a signal which represents the horizontal orientation of the inboard limb 10, and thus of the entire marine loading arm.

The apparatus of the present invention checks the angular position of each loading arm once every second, compares the position of the outboard end of each arm against each of the safe boundaries of three-dimensional space, and provides a warning signal when any arm extends outside any of the safe boundaries. When the arm continues to move away from the safe area the apparatus checks the velocity of the out-of-bounds arm and determines when the arm must be disabled and/or disconnected to prevent damage.

If desired, the present invention can be used to control a plurality of marine loading arms each having a different length and each having a different volume of operating envelope. The lengths of these individual arms and the boundaries of each of the envelopes can be stored in the PROM 37 and the actual position of each arm compared with the corresponding safe boundaries for that particular arm, and an alarm signal can be provided when any of the arms move outside any of the safe boundaries for that arm.

Although the best mode contemplated for carrying out the present invention has been herein shown and described, it will be apparent that modification and variation may be made without departing from what is regarded to be the subject matter of the invention.

What is claimed is:

1. An apparatus for sensing the position in space on the end of an articulated arm having a plurality of pivotally interconnected limbs, a first one of which is pivotally mounted on a fixed support, the apparatus comprising:
   means for sensing a first angle representative of the vertical orientation of said first limb;
   means for sensing a second angle representative of the horizontal orientation of said arm;
   means for sensing a third angle representative of the vertical orientation of a second limb;
   calculator means for using the values of said first, second and third angles to calculate the spatial position of the end of said articulated arm;
   means for storing the spatial boundaries of a working area for said end of said arm;
   means for comparing the actual spatial position of the end of said arm with said boundaries;
   means for calculating the velocity of the end of said arm and for extending the boundaries of said working area by an amount which is dependent upon the arm velocity; and
   means for generating an alarm signal when the spatial position of said end of said arm equals any of said boundaries.

2. Apparatus for sensing position as defined in claim 1 wherein each of said means for sensing an angle includes an absolute angle shaft encoder and means for connecting said encoder between said arm and said fixed support.

3. Apparatus for sensing position as defined in claim 1 wherein each of said means for sensing an angle includes an absolute angle encoder and a magnet, means for mounting said encoder on either said arm of said fixed support, and means for mounting said magnet adjacent said encoder on the other of said fixed support or said arm.

4. Apparatus for sensing position as defined in claim 1 wherein said means for sensing an angle representative of the vertical orientation of either of said limbs includes a pendulum potentiometer coupled to said limb.

5. Apparatus for sensing position as defined in claim 1 wherein said calculator means includes means for retrieving the values of said boundaries from said storage means, and means for comparing the actual spatial position of said end of said arm with the values of each said boundaries.

6. Apparatus for sensing position as defined in claim 1 wherein said calculator means includes a digital processor.

7. Apparatus for sensing position as defined in claim 6 including means for converting the values of said first, second and third angles into digital values for use by said digital processor.

8. Apparatus for sensing position as defined in claim 6 wherein said storage means includes means for storing a computer program for use by said processor, said processor having means for using said program to direct the checking of values of said first, second and third angles and for using said angle values to calculate the spatial position of the end of said arm.

9. Apparatus for sensing position as defined in claim 1 including means for providing a disable signal when said end of said arm moves a predetermined distance outside said working area.

10. Apparatus for sensing position as defined in claim 9 wherein said predetermined distance is determined by the speed of movement of said end of said arm and wherein said speed of movement is determined by said means for calculating said velocity.

11. Apparatus for sensing position as defined in claim 9 wherein said predetermined distance is inversely proportional to the velocity of said end of said arm and wherein said velocity of said end is determined by said means for calculating said velocity.

12. A programmable marine loading arm alarm system for monitoring the position of each of a plurality of marine loading arms and for providing an alarm when the outboard end of any of said loading arms extends outside the boundaries of a three-dimensional working area, each of said arms including an inboard limb pivotally connected between an outboard limb and a riser, said alarm system comprising:
- a plurality of inboard elevation sensors for sensing a first angle representative of each of the inboard limbs relative to a vertical plane;
- a plurality of inboard direction sensors for sensing a second angle representative of each of the inboard limbs relative to a predetermined horizontal direction;
- a plurality of outboard elevation sensors for sensing a third angle representative of each of the outboard limbs relative to a vertical plane;
- calculator means for using the values of said first, second and third angles to calculate the spatial position of the outboard end of each of said loading arms;
- memory means for storing the working boundaries of the outboard end of each of said arms;
- means for comparing the actual spatial position of each of said arms with the corresponding working boundaries for that arm;
- means for calculating the velocity of any loading arm which extends outside said working boundaries and for using the calculated velocity to determine the position of a second boundary at which said system generates a disable signal; and
- alarm means connected to said comparison means for providing an alarm signal whenever the outboard end of any of said loading arms extends outside said working boundaries of said arm.

13. A programmable alarm system as defined in claim 12 including means for providing shut-down signals when the outboard end of any of said loading arms extends a predetermined distance outside any of said working boundaries.

14. A programmable alarm system as defined in claim 13 wherein said predetermined distance is determined by the velocity of said outboard end of said loading arm and wherein said velocity of said outboard end is determined by said means for calculating said velocity.

15. A programmable alarm system as defined in claim 12 wherein each of said elevation sensors includes a potentiometer, means for coupling said potentiometer to a corresponding one of said limbs and a supply voltage coupled to said potentiometer.

16. A programmable alarm system as defined in claim 15 including means for sensing the value of said supply voltage and means for generating a corrective angle signal whenever said supply voltage varies from a standard value.

17. A programmable marine loading arm alarm system for monitoring the position in space of the end of an articulated arm having an inboard limb pivotally connected between an outboard limb and a riser, said alarm system comprising:
- an inboard elevation sensor for developing a first signal representative of the angle of said inboard limb relative to a vertical plane;
- an inboard direction sensor for developing a second signal representative of the angle of said inboard limb relative to a predetermined horizontal direction;
- an outboard elevation sensor for developing a third signal representative of the angle of said outboard limb relative to a vertical plane;
- means for converting said first, second and third signals into digital form;
- digital calculator means for using the digital values of said first, second and third angles to calculate the spatial position of the outboard end of said loading arm;
- digital memory means for storing the spatial boundaries of a working area for said end of said arm;
- calculator means for comparing the actual spatial position of the end of said arm with said boundaries from said digital memory; and
- means for generating an alarm signal when the spatial position of said end of said arm extends outside the working boundaries of said arm.

18. A programmable alarm system as defined in claim 17 including means for using successive spatial positions of the end of said arm to determine the velocity of the end of said arm and for using the calculated velocity to determine the position of a second boundary at which said system generates a disable signal.

19. A programmable alarm system as defined in claim 17 wherein said digital memory includes means for storing the boundaries of an operating enevelope having any desired shape and wherein said calculator includes means for comparing the actual arm position with the boundaries of said operating envelope.

* * * * *